United States Patent
Kato et al.

(10) Patent No.: US 6,666,199 B2
(45) Date of Patent: Dec. 23, 2003

(54) CONTROL DEVICE OF INTERNAL COMBUSTION ENGINE AND METHOD OF JUDGING FAILURE OF SENSOR

(75) Inventors: Naoto Kato, Susono (JP); Toshinari Nagai, Sunto-gun (JP); Akira Kamoto, Susono (JP); Akihiro Katayama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 123 days.

(21) Appl. No.: 09/969,642

(22) Filed: Oct. 4, 2001

(65) Prior Publication Data
US 2002/0043257 A1 Apr. 18, 2002

(30) Foreign Application Priority Data
Oct. 12, 2000 (JP) ........................................ 2000-312386

(51) Int. Cl.[7] .............................................. F02D 41/00
(52) U.S. Cl. ...................... 123/688; 123/697; 701/110
(58) Field of Search ................................. 123/688, 697; 701/102, 110, 114, 22, 24

(56) References Cited

U.S. PATENT DOCUMENTS

| | | | | |
|---|---|---|---|---|
| 5,216,938 A | * | 6/1993 | Yamaguchi | ................. 477/107 |
| 5,291,813 A | * | 3/1994 | Blumenthal et al. | .......... 83/599 |
| 5,454,762 A | * | 10/1995 | Sawase et al. | ................. 475/84 |
| 5,915,368 A | * | 6/1999 | Ishida et al. | ................. 123/675 |
| 6,018,694 A | * | 1/2000 | Egami et al. | ................ 701/102 |
| 6,047,679 A | * | 4/2000 | Matsumoto et al. | ........ 123/396 |
| 6,330,870 B1 | * | 12/2001 | Inoue et al. | ............. 123/90.17 |
| 6,374,818 B2 | * | 4/2002 | Shinjyo et al. | ............. 123/688 |
| 6,401,698 B1 | * | 6/2002 | Yamazaki et al. | .......... 123/529 |

FOREIGN PATENT DOCUMENTS

| JP | 5-202785 | 8/1993 |
|---|---|---|
| JP | A 11-132124 | 5/1999 |

* cited by examiner

Primary Examiner—John Kwon
(74) Attorney, Agent, or Firm—Oliff & Berridge, PLC

(57) ABSTRACT

In a control device, in a control device of an internal combustion engine provided with an internal combustion engine main body mounted to a vehicle and a heater operating on the basis of an output from a specific sensor given as a trigger at least before the internal combustion engine main body starts, whether or not the heater is operated before the start is stored, and it is judged that the sensor has failed when operation of the heater is not stored.

19 Claims, 3 Drawing Sheets

CONTROL DEVICE OF INTERNAL COMBUSTION ENGINE AND METHOD OF JUDGING FAILURE OF SENSOR

The disclosure of Japanese Patent Application No. 2000-312386 filed on Oct. 12, 2000 including the specification, drawings and abstract is incorporated herein by reference in its entirety.

BACKGROUND OF THE INVENTION

1. Field of the Invention

The invention relates to a sensor outputting a trigger for operating a start preparation apparatus before a main body of an internal combustion engine is started, and preferably to a control device of an internal combustion engine provided with a seating switch, a door opening and closing switch and the like, and a method of judging a failure of a sensor.

2. Description of Related Art

In an internal combustion engine for a vehicle which has been conventionally known, an oxygen sensor provided in the internal combustion engine detects an oxygen concentration contained in an exhaust gas. The detected oxygen concentration is used for air-fuel ratio feedback control. The oxygen sensor is heated by energizing an electric current to a heater provided with the oxygen sensor, and is activated by this heating. In order to execute the air-fuel ratio feedback control from the first time of the start of the internal combustion engine, it is necessary to heat the oxygen sensor before starting the internal combustion engine.

A technique for heating before the starting is disclosed in Japanese Patent Application Laid-open Publication No. 5-202785. In the publication, it is disclosed that the heating is started on the basis of opening and closing of a door, an act of sitting in a seat or the like applied as the triggers.

However, in the case of failure of the sensor outputting the triggers, the heating or the like before starting is not executed, so that the control of the internal combustion engine is not optimized. Accordingly, if a sensor of this type fails, it is desirable to detect the failure.

SUMMARY OF THE INVENTION

An object of the invention is to provide a control device of an internal combustion engine which can detect whether or not a specific sensor giving a trigger to a start preparation apparatus before starting a main body of the internal combustion engine has failed, and a method of judging a failure of the sensor.

In accordance with a first aspect of the invention, a control device of an internal combustion engine is provided with an internal combustion engine main body mounted to a vehicle, a start preparation apparatus operating on the basis of an output from a specific sensor given as a trigger at least before the internal combustion engine main body starts, and a failure judging device for judging that the sensor has failed in the case that an output of the sensor at a time when the vehicle is running is different from a defined value.

In the case that the output of the sensor at a time when the vehicle is running is different from the defined value, it is possible to judge that the sensor has failed. It is preferable that the defined value coincides with an output of the sensor at a time when the vehicle is running when the sensor is normal.

In accordance with a second aspect of the invention, a control device of an internal combustion engine is provided with an internal combustion engine main body mounted to a vehicle, a start preparation apparatus operating on the basis of an output from a specific sensor given as a trigger at least before the internal combustion engine main body starts, and a failure judging device storing whether or not the start preparation apparatus is operated before the start and judging that the sensor has failed in the case that the operation of the start preparation apparatus is not stored.

That is, in the case that the operation is not stored, that is, in the case that no history is stored, it is possible to presume that the trigger is not generated due to failure of the sensor, so that in this case, it is also judged that the sensor has failed.

Further, it is preferable that failure of the sensor is determined when a number of times that the failure is judged reaches a plurality of predetermined number of times.

In particular, if the failure of the sensor is determined in the case that the number of times that the failure is judged continuously reaches a plurality of predetermined number of times, it is possible to more reliably determine the failure.

It is preferable that the start preparation apparatus is a heater provided with the internal combustion engine.

It is preferable that the heater is structured such as to heat an oxygen sensor detecting an oxygen concentration in an exhaust gas of the internal combustion engine according to the operation of the heater.

It is preferable that the sensor is an opening and closing switch detecting opening and closing of a door of a vehicle. That is, since the door is closed at a time when the vehicle is running, a failure diagnosis can be executed so that in the case that the output of the opening and closing switch indicates "closed", the sensor is normal, and in the case that the output of the opening and closing switch indicates "open", the sensor is abnormal.

It is preferable that the sensor is a seating switch detecting whether or not a driver sits in a seat of the vehicle. That is, since the driver is seated therein when the vehicle is running, a failure diagnosis can be executed so that in the case that the output of the seating switch indicates "seated", the sensor is normal, and in the case that the output of the seating switch indicates "not seated", the sensor is abnormal.

DETAILED DESCRIPTION OF THE PREFERRED EMBODIMENTS

Figure 1:
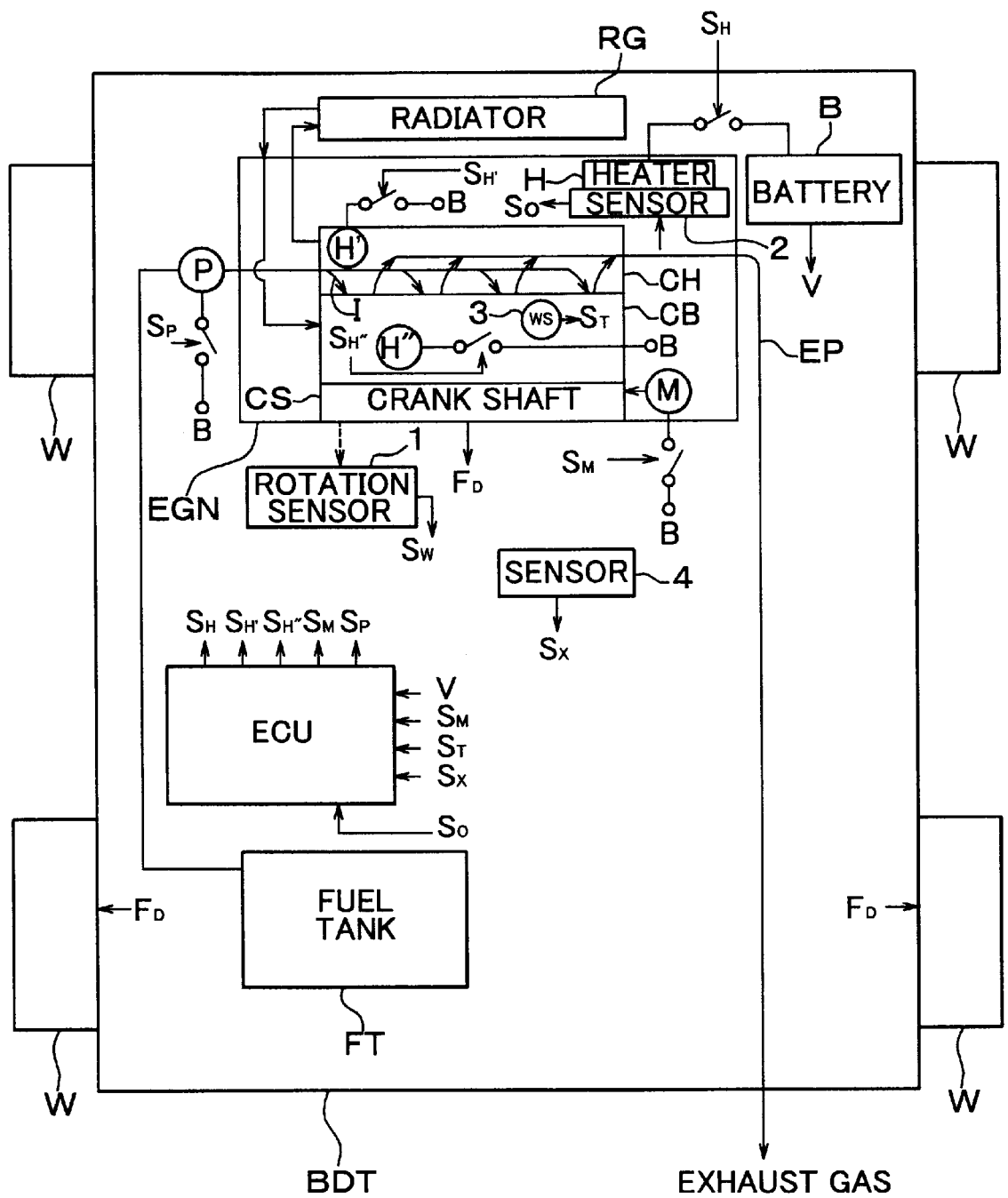
FIG. 1 is a schematic block diagram of a system of a vehicle mounting a control device of an internal combustion engine thereon.

A description will be given below of a control device of an internal combustion engine in accordance with an embodiment. In this case, the same reference numerals denote the same elements, and an redundant descriptions will be omitted.

FIG. 1 is a schematic block diagram of a system of a vehicle mounting a control device of an internal combustion engine thereon. The vehicle mounts an internal combustion engine EGN within a vehicle body BDY.

The internal combustion engine EGN is provided with an internal combustion engine main body starting on the basis of an electric power supplied from a battery B, and a start preparation apparatus (heaters H, H' and H" and a fuel pump P mentioned below) operating on the basis of an electric power supplied from the battery B at least before the internal combustion engine main body starts.

The internal combustion engine main body is provided with a cylinder block CB including a plurality of cylinders, a cylinder head CH supplying an air and a fuel within the cylinder block CB and discharging an exhaust gas after combustion, a crank shaft CS converting a linear reciprocating motion of the cylinder into a rotational motion, and a starter motor M rotating the crank shaft CS at a time of starting.

A fuel tank FT is mounted within the vehicle body BDY. The fuel outputted from the fuel tank FT via the pump P is supplied within the cylinder head CH. The fuel is supplied into a cylinder within the cylinder block CB at a proper air-fuel ratio by controlling the pump P and a throttle valve (not shown). The fuel explodes within the cylinder, whereby the cylinder linearly reciprocates and the crank shaft CS linked thereto rotates. A rotational number (a cranking rotational number S) per a unit time of the crank shaft CS is detected by a rotation sensor 1, and a rotation driving force FD is transmitted to rear wheels or front wheels. The rotation sensor 1 outputs a signal indicating the cranking rotational number S. In this case, in the description, the same reference symbol is used for an output signal of each of the sensors, and a physical amount indicated by the output signal.

Further, the exhaust gas discharged from the inner portion of the cylinder is discharged out of the vehicle through an exhaust pipe EP. An oxygen sensor 2 is mounted to the exhaust pipe EP. The oxygen sensor 2 detects a concentration of an oxygen contained in the exhaust gas discharged from the internal combustion engine main body so as to output a signal So indicating the oxygen concentration. Since the oxygen concentration indicates an air-fuel ratio, the electronic control device ECU executes an air-fuel ratio feedback control on the basis of the air-fuel ratio detected here.

In this case, since the oxygen sensor 2 is activated by being heated to a temperature at 700 to 800° C., the heater H heating this is provided so as to be attached to the oxygen sensor 2.

Further, an injector I provided within the cylinder head CH is heated by the heater H' for the injector.

Further, the heater H" for heating a cooling water is mounted to a water jacket provided in the periphery of the cylinder block CB, and the heater H" heats the cooling water. The cooling water from a radiator RG returns to the radiator RG after circulating through the cylinder block CB and the cylinder head CH and a temperature of the cooling water is detected by a coolant temperature sensor 3 mounted to the water jacket. The coolant temperature sensor 3 outputs a signal ST indicating a temperature of the cooling water.

Further, a sensor 4 detecting an operation performed before the driver turns on an ignition switch so as to rotate a starter motor M (the internal combustion engine main body starts), that is, an internal combustion engine start preliminary operation, is mounted to the vehicle body BDY.

The preliminary operation includes an operation in which the driver opens the door on the driver's seat side and thereafter closes it, an act of sitting in the seat, an operation of locking the door, an operation of approaching a position at which the vehicle can receive an output radio wave in the case of holding a radio wave transmitting type key, and an operation in which the vehicle receives a signal from a remote control type engine starting apparatus. A door opening and closing sensor (switch), a seating sensor (switch), a door lock detecting sensor, a radio wave receiver for approaching and a radio wave receiver for an engine starter respectively, as the sensor 4, output a preliminary operation information Sx mentioned above; however, the preliminary operation information Sx may be constituted by any one information of the preliminary operations mentioned above or an information obtained by suitably combining a plurality of preliminary operations.

The electronic control device ECU controlling the vehicle on the basis of the information input from various kinds of sensors is provided within the vehicle body BDY.

The input information to the electronic control device ECU includes a voltage V of the battery B, a cranking rotational number $S\omega$, a water temperature ST, the preliminary operation information Sx, the oxygen concentration So and the like.

The output signal (control signal) from the electronic control device ECU includes a signal ($S_H$) for heating (energizing) the oxygen sensor heater, a signal ($S_{H'}$) for heating (energizing) the injector heater, a signal ($S_{H''}$) for heating (energizing) the cooling water, a signal $S_M$ for starting (energizing) the starter motor M, a signal $S_P$ for driving (energizing) the fuel pump P, and the like. In this case, the respective start preparation apparatuses H, H', H" and P and the battery B are electrically connected by these signals $S_H$, $S_{H'}$, $S_{H''}$, and $S_P$, the starter motor M and the battery B are connected on the basis of the input of the signal $S_M$ for starting the starter motor, and the crank shaft CS rotates.

The electronic control device ECU executes various kinds of controls on the basis of the input information. A detailed description will be given below.

The start control of the internal combustion engine main body is as follows. At first, a specific trigger, that is, the preliminary operation information Sx is inputted from the sensor 4 such as the seating sensor or the like, the start preparation is started, the signals $S_H$, $S_{H'}$, $S_{H''}$, and $S_P$ are outputted, and the electric current application to the start preparation apparatuses (the heaters H, H' and H" and the fuel pump P) is started. Thereafter, the ignition switch is turned on or the like, whereby the starter motor M rotates, and in the case that the internal combustion engine main body sequentially starts smoothly, that is, in the case that the cranking rotational number exceeds a predetermined value, the electric current application to the starter motor M is inhibited, and the start control is finished.

Accordingly, in the case that the sensor 4 has not failed, "history" that the electric current application is executed remains. The electronic control device ECU stores the history. In this case, due to the electric current application, the heater is heated, and the pump is driven.

The start control mentioned above is set to be normal, and a failure diagnosis of the sensor 4 is executed during running of the vehicle or at a proper period after the vehicle has run.

Figure 2:
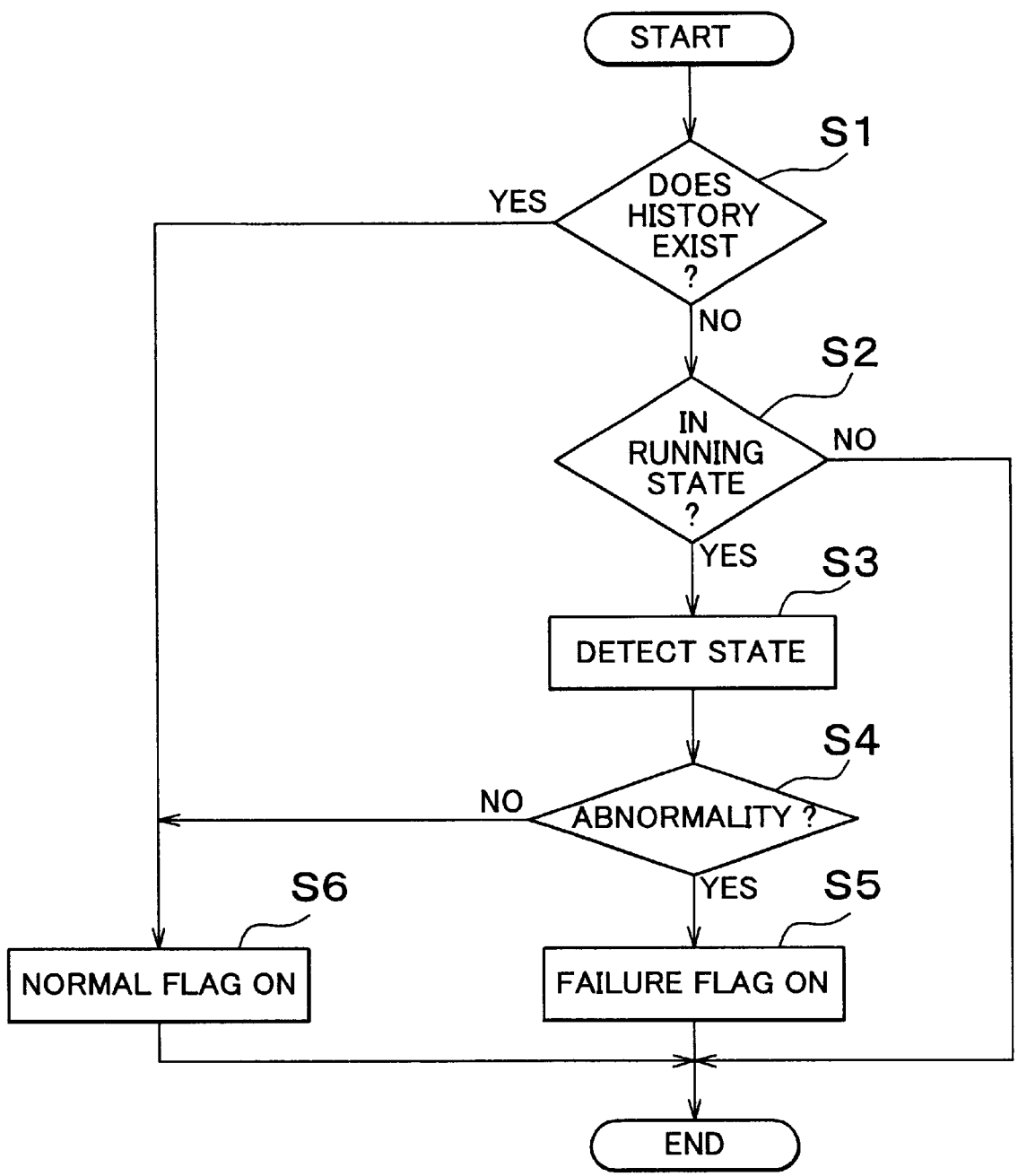
FIG. 2 is a flow chart showing a failure diagnosis process executed by an electronic control device ECU.

FIG. 2 is a flow chart showing a failure diagnosing process executed by the electronic control device ECU.

First, in the case that the vehicle has been run, it is first judged whether or not the history is stored (S1). If the sensor 4 is normal, the history mentioned above is supposed to be stored after the preceding stop of the internal combustion engine main body before the current start. Accordingly, in the case that a history exists, it is judged that the sensor 4 is normal, and a flag indicating such is set (S6). In the case that a history does not exist, it is judged whether or not the vehicle is now in a running state (S2), and in the case that the vehicle is not in a running state, a temporary failure diagnosis process is finished. It is possible to judge, for example, from a vehicle speed detected by a rotational number of a propeller shaft or a tire wheel whether or not the vehicle is in a running state.

In the case that the vehicle is in a running state, the output signal Sx of the sensor 4 is taken in (S3), and an abnormality judgment of the sensor 4 is executed on the basis whether or not the output signal Sx is different from the defined value (S4). In the case that the output signal Sx is different from the defined value, it is judged that the sensor 4 has failed and a flag indicating such is set (S5), and in the case that it coincides with the defined value, it is judged that the sensor 4 is normal and a flag indicating such is set (S6). In this case, the defined value mentioned above coincides with the output of the sensor 4 at a time when the vehicle is running in the case that the sensor 4 is normal.

The sensor 4 may be constituted by an opening and closing switch detecting opening and closing of the door of the vehicle. That is, since the door is closed at a time when the vehicle is running, a failure diagnosis can be executed so that in the case that an output of the opening and closing switch indicates "closed" at a time when the vehicle is running, the sensor is normal, and in the case that the output of the opening and closing switch indicates "open", the sensor is abnormal. In this case, "closed" is set to the defined value mentioned above.

The sensor 4 may be constituted by a seating switch detecting whether or not the driver is seated in the seat of the vehicle. That is, since the driver is seated in the seat at a time when the vehicle is running, a failure diagnosis can be executed so that in the case that the output of the seating switch indicates "seated" at a time when the vehicle is running, the sensor is normal, and in the case that the output of the seated switch indicates "not seated", the sensor is abnormal. In this case, "seated" is set to the defined value mentioned above.

The sensor 4 may be constituted by a courtesy switch indicating a lock state of the door. In this case, "locked" is set to the defined value mentioned above, however, it is possible to judge that the sensor 4 is abnormal when locking and unlocking the door when the vehicle is running and in the case that the switch is not operated.

As mentioned above, in accordance with the present control device ECU, in the case that the output of the sensor at a time when the vehicle is running is different from the defined value in the control device ECU of the internal combustion engine provided with the internal combustion engine main body mounted to the vehicle and the start preparation apparatus operating on the basis of the output from the specific sensor 4 as the trigger at least before the internal combustion engine main body starts, it is judged that the sensor 4 has failed. In the case that the output of the sensor 4 at a time when the vehicle is running is different from the defined value, it is possible to judge that the sensor 4 has failed. It is preferable that the defined value coincides with the output of the sensor at a time when the vehicle is running in the case that the sensor 4 is normal.

Next, a description will be given of a control of judging the failure of the sensor 4 on the basis of the history mentioned above.

Figure 3:
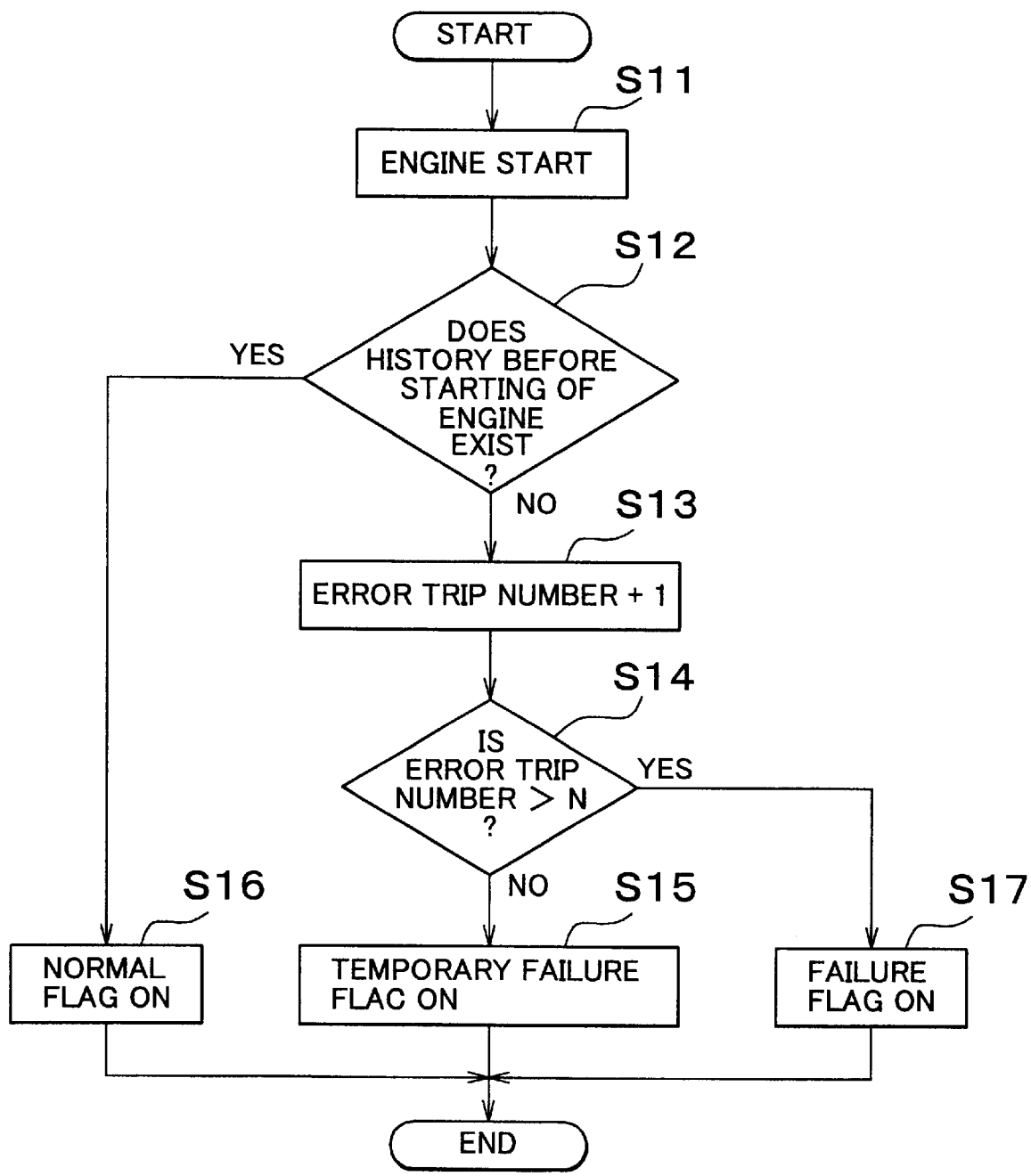
FIG. 3 is a flow chart showing another failure diagnosis process executed by the electronic control device ECU.

FIG. 3 is a flow chart showing another failure diagnosing process executed by the electronic control device ECU. For the purpose of simplicity, it is supposed that the present process is executed at a time of turning on the ignition switch.

First, the internal combustion engine main body is started by turning on the ignition switch (S11). Next, it is judged whether or not the history mentioned above exists before the current start (S12), and in the case that the history exists, it can be judged that the sensor 4 is normal and a flag indicating such is set (S16). In the case that the history does not exist, no history exists after the preceding stop of the internal combustion engine before the current start of the internal combustion (1 cycle), so that it is judged to have failed, and this cycle is counted as one error cycle (S13). As a the number cycles counted increase, in the case that the number of the error cycles becomes equal to or greater than a predetermined value N (S14), the sensor 4 is determined to have failed and a flag indicating such is set (S17). In the case that the number of the error cycles is less than the predetermined value N (S14), failure of the sensor 4 is not determined, it is judged that a temporary failure state, and a flag indicating such is set (S15).

In this case, in order to leave the history mentioned above, information indicating that the trigger was output may be stored, or information indicating that a subject to be controlled is operated may be stored. Further, the value N mentioned above may be set to be equal to 1. Further, the structure may be made such that failure is determined only after a plurality of failures are successively judged in both processes in FIGS. 2 and 3. Further, it is possible to determine the failure on the basis of the frequency of generation of the temporary failure state.

As described above, in accordance with the control device ECU, in the control device of the internal combustion engine provided with the internal combustion engine main body mounted to the vehicle and the start preparation apparatus (the heaters H, H' and H" and the fuel pump P) operating on the basis of the output from the specified sensor 4 as the trigger at least before the internal combustion engine main body starts, whether or not the start preparation apparatus H is operated before the start is stored, and it is judged that the sensor 4 has failed in the case that the operation of the start preparation apparatus H is not stored.

That is, in the case that the operation is not stored, that is, the history does not exist, it is possible to suppose that the trigger is not generated due to failure of the sensor 4, so that it is judged that the sensor 4 has failed in this case.

Further, in both judging methods shown in FIGS. 2 and 3, it is preferable in view of reliability of judgment that failure of the sensor 4 is determined when the number of times that the failure is judged reaches a plurality of predetermined number of times. In particular, it is possible to more reliably determined failure if failure of the sensor 4 is determined in the case that the number of times that the failure is judged continuously reaches a plurality of predetermined number of times.

In this case, it is preferable that the start preparation apparatus is the heaters H, H' and H" provided in the internal combustion engine, in this case, the history corresponds to a history of heating. Further, this may be a heater for heating the internal combustion engine and transmission oil.

In this case, even when the history mentioned above does not exist before the internal combustion engine main body starts, if the history exists before the vehicle runs, it is possible to judge that this as a temporary failure. Accordingly, for example, in the case that the opening state of the door is set to be the trigger, it is possible to restrict an erroneous judgment such as when start operation is executed without opening the door. As mentioned above, when the temporary failure judgment is integrated, a failure judgment is determined.

Here, in the case that the history mentioned above does not exist after the internal combustion engine main body starts before it stops, unless the running history of the vehicle exists, it is possible to cancel a failure judgment. Accordingly, for example, it is possible to restrict an erroneous judgment when performing maintenance on the vehicle or the like. Any one of the respective judging methods shown in FIGS. 2 and 3, as well as that mentioned above, or a combination thereof, may be employed, whereby it is possible to judge with high accuracy.

What is claimed is:

1. A control device of an internal combustion engine comprising:

an internal combustion engine main body mounted to a vehicle;

a start preparation apparatus operating on the basis of an output from a specific sensor given as a trigger at least before said internal combustion engine main body starts; and a failure judging device for judging that said sensor has failed when an output of said sensor when said vehicle is running is different from a defined value.

2. A control device as claimed in claim 1, wherein the failure of said sensor is determined when a number of times that said failure is judged reaches a plurality of predetermined number of times.

3. A control device as claimed in claim 1, wherein the failure of said sensor is determined when a number of times that said failure is judged continuously reaches a plurality of predetermined number of times.

4. A control device as claimed in claim 1, wherein said start preparation apparatus is a heater provided with said internal combustion engine.

5. A control device as claimed in claim 4, wherein said heater is structured so as to heat an oxygen sensor detecting an oxygen concentration in an exhaust gas of said internal combustion engine according to operation of the heater.

6. A control device as claimed in claim 1, wherein said sensor is an opening and closing switch detecting opening and closing of a door of said vehicle.

7. A control device as claimed in claim 6, wherein said defined value is a value in which an output of said opening and closing switch indicates "closed".

8. A control device as claimed in claim 1, wherein said sensor is a seating switch detecting whether or not a driver is seated in a seat of said vehicle.

9. A control device as claimed in claim 8, wherein said defined value is a value in which an output of said seating switch indicates "seated".

10. A control device as claimed in claim 1, wherein said defined value coincides with an output of said sensor when said vehicle is running when said sensor is normal.

11. A control device of an internal combustion engine comprising:

an internal combustion engine main body mounted to a vehicle;

a start preparation apparatus operating on the basis of an output from a specific sensor given as a trigger at least before said internal combustion engine main body starts; and a failure judging device storing whether or not said start preparation apparatus is operated before said start and judging that said sensor has failed when operation of said start preparation apparatus is not stored.

12. A control device as claimed in claim 11, wherein the failure of said sensor is determined when a number of times that said failure is judged reaches a plurality of predetermined number of times.

13. A control device as claimed in claim 11, wherein the failure of said sensor is determined when a number of times that said failure is judged continuously reaches a plurality of predetermined number of times.

14. A control device as claimed in claim 11, wherein said start preparation apparatus is a heater provided with said internal combustion engine.

15. A control device as claimed in claim 14, wherein said heater is structured such as to heat an oxygen sensor detecting an oxygen concentration in an exhaust gas of said internal combustion engine according to operation of the heater.

16. A control device as claimed in claim 11, wherein said sensor is an opening and closing switch detecting opening and closing of a door of said vehicle.

17. A control device as claimed in claim 11, wherein said sensor is a seating switch detecting whether or not a driver is seated in a seat of said vehicle.

18. A method of judging a failure of a sensor in an internal combustion engine provided with an internal combustion engine main body mounted to a vehicle, and a start preparation apparatus operating on the basis of an output from a specific sensor given as a trigger at least before said internal combustion engine main body starts, comprising the steps of:

detecting an output from said sensor; and judging that said sensor has failed when the output of said sensor when said vehicle is running is different from a defined value.

19. A method of judging a failure of a sensor in an internal combustion engine provided with an internal combustion engine main body mounted to a vehicle, and a start preparation apparatus operating on the basis of an output from a specific sensor given as a trigger at least before said internal combustion engine main body starts, comprising the steps of:

storing whether or not said start preparation apparatus is operated before said start; and judging that said sensor has failed when operation of said start preparation apparatus is not stored.

* * * * *